(12) United States Patent
Peulecke et al.

(10) Patent No.: US 9,087,416 B2
(45) Date of Patent: Jul. 21, 2015

(54) ONBOARD INFORMATION SYSTEM WITH ANTENNA FOR RECEIVING SATELLITE-BASED GEOPOSITION DATA

(75) Inventors: Jens Peulecke, Villingen-Schwenningen (DE); Torsten Wahler, Bad Dürrheim (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 13/331,965

(22) Filed: Dec. 20, 2011

(65) Prior Publication Data

US 2012/0158210 A1 Jun. 21, 2012

(30) Foreign Application Priority Data

Dec. 20, 2010 (DE) .......................... 10 2010 055 205
Mar. 11, 2011 (DE) .......................... 10 2011 013 667

(51) Int. Cl.
| | | |
|---|---|---|
| *G06F 7/00* | (2006.01) | |
| *G07C 7/00* | (2006.01) | |
| *G01S 19/36* | (2010.01) | |
| *H01Q 1/32* | (2006.01) | |
| *H01Q 9/04* | (2006.01) | |
| *H01Q 21/28* | (2006.01) | |

(52) U.S. Cl.
CPC . *G07C 7/00* (2013.01); *G01S 19/36* (2013.01); *H01Q 1/3291* (2013.01); *H01Q 9/0407* (2013.01); *H01Q 9/0421* (2013.01); *H01Q 21/28* (2013.01)

(58) Field of Classification Search
CPC .................................. G06F 7/00; G01S 19/36
USPC ............................................................ 701/1
See application file for complete search history.

(56) References Cited

U.S. PATENT DOCUMENTS

| | | | | |
|---|---|---|---|---|
| 4,894,663 | A * | 1/1990 | Urbish et al. ................ | 343/702 |
| 5,523,761 | A * | 6/1996 | Gildea ..................... | 342/357.31 |
| 5,777,585 | A * | 7/1998 | Tsuda et al. .................. | 343/702 |
| 6,046,703 | A * | 4/2000 | Wang et al. .................. | 343/795 |
| 6,133,884 | A * | 10/2000 | Talvitie et al. ................ | 343/702 |
| 6,223,062 | B1 * | 4/2001 | Davidson et al. .......... | 455/575.1 |
| 6,539,306 | B2 * | 3/2003 | Turnbull ..................... | 701/493 |
| 6,678,614 | B2 * | 1/2004 | McCarthy et al. ........... | 701/440 |
| 7,012,569 | B2 * | 3/2006 | Gottwald et al. ...... | 343/700 MS |
| 7,023,379 | B2 * | 4/2006 | Turnbull .................. | 342/357.75 |
| 7,049,982 | B2 * | 5/2006 | Sleboda et al. .......... | 340/995.27 |
| 7,109,930 | B1 * | 9/2006 | Tsuda et al. .................. | 343/702 |

(Continued)

FOREIGN PATENT DOCUMENTS

| | | |
|---|---|---|
| CN | 101663562 | 3/2010 |
| DE | 60 2006 000 047 T2 | 4/2008 |

(Continued)

*Primary Examiner* — Thomas Tarcza
*Assistant Examiner* — Alex C Dunn
(74) *Attorney, Agent, or Firm* — Cozen O'Connor

(57) ABSTRACT

An onboard information system having an antenna for receiving satellite-based geoposition data. The onboard information system includes a housing that can be installed in a vehicle interior and a module for processing satellite-based geoposition data. The antenna for receiving satellite-based geoposition data is arranged on the housing such that in the installed state a reception direction of the antenna points toward the vehicle interior. The onboard information system can be used particularly in a vehicle as a tachograph, preferably as a digital tachograph, and/or toll collection appliance.

15 Claims, 5 Drawing Sheets

(56) References Cited

U.S. PATENT DOCUMENTS

| | | |
|---|---|---|
| 7,142,980 B1 | 11/2006 | Laverick et al. |
| 7,355,525 B2 * | 4/2008 | Tengler et al. ............... 340/905 |
| 7,511,675 B2 * | 3/2009 | Puente-Baliarda et al. .. 343/713 |
| 7,530,617 B2 * | 5/2009 | Kirner ..................... 296/37.12 |
| 7,538,723 B2 | 5/2009 | Davis et al. |
| 7,606,660 B2 * | 10/2009 | Diaz et al. ..................... 701/431 |
| 7,848,654 B2 * | 12/2010 | Sauer et al. .................. 398/115 |
| 7,936,306 B2 * | 5/2011 | Mierke et al. .......... 343/700 MS |
| 8,452,306 B2 * | 5/2013 | Qahwash et al. ......... 455/456.2 |
| 2002/0111149 A1 * | 8/2002 | Shoki .......................... 455/277.1 |
| 2003/0020657 A1 | 1/2003 | Sakamoto et al. |
| 2004/0121645 A1 * | 6/2004 | Postrel ......................... 439/374 |
| 2005/0086100 A1 * | 4/2005 | Yanagisawa et al. .......... 705/13 |
| 2005/0146445 A1 * | 7/2005 | Sleboda et al. ............... 340/988 |
| 2005/0273218 A1 * | 12/2005 | Breed et al. ..................... 701/2 |
| 2006/0279379 A1 * | 12/2006 | Gale ............................ 333/131 |
| 2007/0067088 A1 | 3/2007 | Baig |
| 2007/0146162 A1 * | 6/2007 | Tengler et al. ............... 340/905 |
| 2009/0043441 A1 * | 2/2009 | Breed ............................ 701/29 |
| 2010/0234071 A1 * | 9/2010 | Shabtay et al. ............. 455/562.1 |

FOREIGN PATENT DOCUMENTS

| | | |
|---|---|---|
| EP | 1 328 041 | 7/2003 |
| EP | 1 328 041 A1 | 7/2003 |
| EP | 1 538 572 A2 | 6/2005 |
| EP | 1 790 530 A1 | 5/2007 |
| KR | 2010/0053984 A | 5/2010 |

* cited by examiner

ONBOARD INFORMATION SYSTEM WITH ANTENNA FOR RECEIVING SATELLITE-BASED GEOPOSITION DATA

BACKGROUND OF THE INVENTION

1. Field of the Invention

The present invention relates to an onboard information system having an antenna for receiving satellite-based geoposition data.

2. Description of the Related Art

Onboard information systems, particularly tachographs, toll collection appliances or what are known as universal onboard units, which combine the functions of tachographs and toll collection appliances, must meet ever higher technical demands. Particularly the possibility of tracking the position of a vehicle, for example a heavy goods vehicle, using a geoposition system affords a large number of new opportunities for application, for toll collection, navigation or monitoring of safety-related goods during transport.

EP 1 328 041 A1 discloses a receiver arranged in a toll computer for data from the global positioning system (GPS. A drawback of the prior art is that although a receiver module for geoposition data may be integrated in a housing for a toll collection system, the associated antenna is fitted outside of the housing at another position in the vehicle. This fitting in the vicinity of a screen or outside of the vehicle interior is necessary because signals from geoposition satellites are much weaker in comparison with mobile radio signals. By way of example, mobile radio signals based on the GSM standard have a signal strength of between 3 dB and −6 dB, whereas signals from geoposition satellites have a signal strength of between −140 dB and −160 dB on the Earth's surface. On account of the weak geoposition signals, it is often even necessary for an antenna to be fitted on an outer side of the vehicle, and hence for there to be a direct line of sight between the antenna and the sending satellites. This is particularly disadvantageous because beside mounting of the antenna this requires an additional wired or wireless connection to be made between the antenna and the receiver module accommodated in the housing of the onboard information system.

SUMMARY OF THE INVENTION

The present invention is therefore based on developing an onboard information system having an antenna for receiving satellite-based geoposition data.

An onboard information system according to one embodiment of the invention is designed for capturing at least one vehicle-related variable and comprises a housing that can be installed in a vehicle interior and a module for processing satellite-based geoposition data, wherein an antenna for receiving the satellite-based geoposition data is arranged on the housing of the onboard information system such that in the installed state a reception direction points toward the vehicle interior.

The housing of the onboard information system comprises a module for processing the received geoposition signals and forms a compact and easily installable unit. The antenna is also compactly integrated as a component needed for reception, the reception direction of the antenna pointing into the vehicle interior for the purpose of better reception of the geoposition signals, which have only low signal strength. Otherwise, the reception direction would point into the engine block or another component of a vehicle which has electrically conductive portions, which would make reception more difficult.

In comparison with onboard information systems known from the prior art, a solution according to one embodiment of the invention affords the advantage of combining all the components which are required for receiving satellite-based geoposition data in one housing, which means that the resultant unit can be installed and removed in/from vehicles easily and quickly and at the same time the antenna for receiving satellite-based geoposition data no longer needs to be positioned separately at another position in the vehicle.

Advantageously, provision may be made for the housing to have a panel that covers only one side of the housing, wherein the housing has, in a region behind the panel, at least one mounting element for permanent installation in the vehicle interior. The mounting element allows the housing to be fitted securely in the vehicle interior, with the side of the housing on which the panel is fitted being able to be accessible to a user of the onboard information system and being able to point into the vehicle interior. The panel therefore protects the housing against mechanical impairment and enhances the aesthetics of the housing.

In one embodiment, the antenna may be in the form of a patch antenna, which allows inexpensive production of the antenna and a space-saving arrangement on the housing. In addition, a patch antenna can be used very well to adjust a directivity, that is to say a preferred reception direction for the antenna, for example in the direction of the vehicle interior.

Particularly advantageously, a reception body of the antenna may be positioned centrally on a ground plane of the antenna. The performance of an antenna, particularly of a patch antenna, is influenced positively by a ground plane which is as large as possible and is preferably distributed evenly around the reception body, as a result of which such an arrangement is still unable to receive even weak geoposition signals.

In addition, provision may be made for the ground plane of the antenna to advantageously comprise a laminated printed circuit board, the lamination preferably having been accomplished using copper. The lamination of the printed circuit board produces a space-saving and nevertheless conductive printed circuit board which can easily be fitted onto the housing of the onboard information system.

Particularly advantageously, the antenna for receiving geoposition data may be fitted on a portion of the housing that protrudes into the vehicle interior. This lends itself to the use of a pull-out drawer, in particular. Even if no direct reception of satellite signals should be possible, the reception characteristics of the antenna can be improved by fitting it on a portion of the housing that protrudes into the vehicle interior, since this means that the antenna adopts an exposed position which is similar to that of an antenna which is not fitted on the housing, and the distance from an electrically conductive portion of the housing is increased.

In a further advantageous development, the housing may be installed in a pit having dimensions according to an ISO 7736 standard. As a result, the housing corresponds to a standard size for installation in consoles in a vehicle, for example in a radio compartment. The housing of the onboard information system can therefore be installed and removed easily and without difficulty in models from different manufacturers.

Advantageously, an electrically conductive portion of the housing is fitted on a side of the antenna which is remote from the reception direction of the antenna. This prevents the antenna from being covered by electrically conductive portions and therefore from impairing reception.

Particularly advantageously, the onboard information system may comprise a mobile radio antenna for receiving mobile radio signals and a mobile radio module. This further increases the variability of the onboard information system by virtue of data interchange via mobile radio also being able to take place.

In one advantageous development, an electrically conductive part of the housing of the onboard information system and the radiating plane of the mobile radio antenna may be at a distance of at least 50% of an overall height of the mobile radio antenna. In one particularly advantageous development, the distance between the radiating plane of the mobile radio antenna and an electrically conductive part is at least 100% of the overall height of the mobile radio antenna. The distance of at least 50% of the overall height of the mobile radio antenna ensures that the mobile radio antenna can still be constructed compactly with the housing, since the dimensions are kept small, but there is also a sufficient distance from electrically conductive parts of the housing which have a negative influence on the performance of the mobile radio antenna.

In one advantageous development, the mobile radio antenna and the antenna for receiving satellite-based geoposition data are fitted on opposite sides of the housing. Therefore, the mobile radio antenna does not influence the reception of the antenna for receiving satellite-based geoposition data, since the distance between the two antenna types is at a maximum, while the housing is still of compact design and both units are fitted thereon. The reason is that when positioning the mobile radio antenna and the antenna for receiving satellite-based geoposition data, it cannot be ruled out that the mobile radio antenna will interfere with or even totally prevent the reception by the other antenna.

Particularly advantageously, an onboard information system having the cited features can be used in a vehicle as a tachograph, particularly as a digital tachograph, and/or as a toll collection appliance, with a combination of the features of tachograph and toll collection appliance prompting the term universal onboard unit. This achieves a technical extension of these appliances. For this, the tachograph and the toll collection appliance may have a processor, a memory unit and a data bus. The data bus receives signals delivered by one or more sensors. By way of example, the sensors may be positioned in the engine block or on shafts in the vehicle and may measure revolutions of the shafts. The data received from the data bus are processed by the processor and stored in the memory unit. From there, they can be read and copied to an external memory unit or output on a display unit in the onboard information system. The module for processing satellite-based geoposition data and the mobile radio module are connected directly to an internal bus in the processor, as a result of which the received data can be processed directly at this location. Vehicle-related variables which are captured by a tachograph or toll collection system may be speed, current coordinates or temperatures.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Exemplary embodiments of the invention are illustrated in the drawings and are explained below with reference to FIGS. 1 to 7, in which.

DETAILED DESCRIPTION OF THE PRESENTLY PREFERRED EMBODIMENTS

Figure 1:
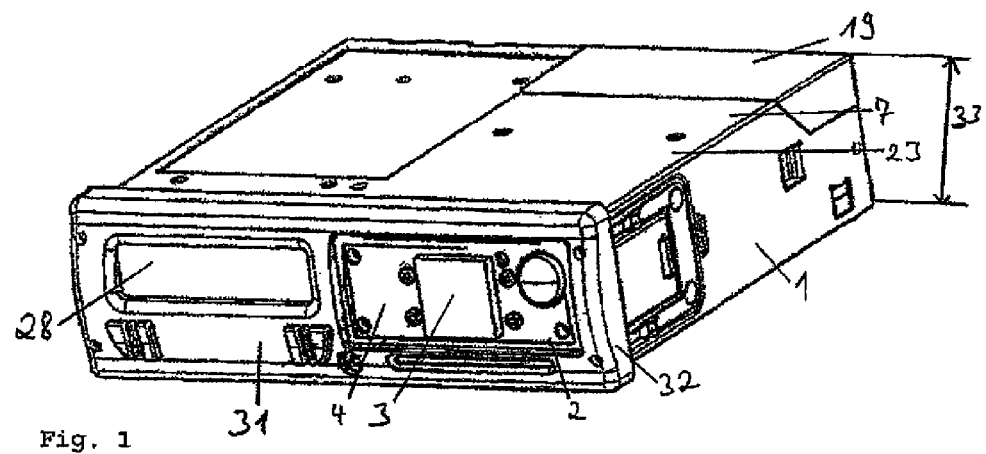
FIG. 1 is a perspective front view of a housing of an onboard information system with an antenna.

FIG. 1 shows a front view of the housing 1 of an onboard information system according to one embodiment of the invention, i.e. the front 31 which is shown from the housing 1 is facing a vehicle interior following installation, that is to say is accessible to a user, such as the driver. In the case shown, the onboard information system is a digital tachograph, but it may also be in the form of a conventional tachograph, toll collection appliance or in the form of a universal onboard unit or may comprise such appliances.

The dimensions of the housing 1 are preferably chosen according to an ISO 7736 or a DIN 75490 standard, as a result of which it can be installed without difficulty in pits, for example radio pits in the dashboard of a vehicle, in a large number of models from different manufacturers. The housing 1 includes a conductive material, in the present case a metal. Alternatively, the housing 1 may comprise an electrically nonconductive material. A housing height 33 is 50 mm in the exemplary embodiment shown.

The front 31 of the housing 1 has a panel 32 for aesthetic embellishment and protection of the housing 1. The panel 32 comprises a dielectric material. In addition, the front has a display element 28 fitted to it for displaying one or more captured vehicle-related variables. For this, the panel 32 has an appropriate recess. The vehicle-related variables may be speed, current coordinates, temperatures or total distance covered, for example, but may also be driving times and rest times for a driver. The front 31 of the housing 1 may also have operator control elements for adjusting various parameters, for changing over the data captured between a first and a second driver, or sockets for taking various connectors, for external memory units, positioned on it.

The front 31 has an antenna 2 arranged on it for receiving satellite-based geoposition data. In the exemplary embodiment shown, the antenna 2 comprises a reception body 3 and a ground plane 4, the reception body 3 being positioned centrally on the ground plane 4. In this case, the ground plane 4 is fitted to the housing 1 by a screw, adhesive, or clamp joint. The antenna 2 is a patch antenna having a ceramic basic body, and the ground plane 4 comprises a printed circuit board laminated with copper. Instead of a patch antenna, other antenna designs can also be used. The ground plane 4 may also comprise a conductive material without lamination and may have recesses, for example for operator control elements such as drawer unlocking devices.

The reception body 3 is arranged such that a reception direction for the antenna 2 in the installed state points into the vehicle interior and electrically conductive portions of the housing 1 are arranged opposite to this reception direction of the antenna 2. For improved reception, the antenna 2 may have a directivity, that is to say may be particularly well suited to reception in one direction. In this case, the directivity can be produced by a metal layer which serves as a reflector situated behind the reception body 3. The geoposition data received by the antenna 2 are forwarded to a module for processing the geoposition data however, in the same way as the connection between the antenna 2 and the module, on account of the position of these portions inside the housing 1.

In FIG. 1, the antenna 2 is not covered and the reception body 3 has dimensions that correspond approximately to half a wavelength of the signal to be received. The reception body 3 has a square outer surface area and is designed to receive signals having right-circular polarization. Alternatively, the reception body 3 may also be designed to receive waves having linear polarization, in which case the outer surface area is of rectangular design and one side is twice as long as the other side of the rectangle. The antenna 2 is able to receive geoposition data based on the GPS standard and/or one of the standards of other satellite-based navigation systems such as Galileo, GLONASS, COMPASS, IRNSS or QZSS.

The ground plane 4 has as large a surface area as possible and is positioned evenly around the reception body 3. The surface of the reception body 3 which points into the vehicle interior and the ground plane 4 are arranged parallel to one another. The ground plane 4 has recesses used to connect the antenna 2 to the housing 1, by screwing, riveting or clamping. As an alternative to the cited methods, the ground plane 4 may also be connected to the housing 1 by an adhesive joint. The complete antenna 2 has a surface area that covers between one third and half of the front 31 of the housing 1 in order to allow the best possible reception of the geoposition signals.

In the exemplary embodiment shown in FIG. 1, a top 23 of the outer side 7 has a cover 19 fitted to it which is intended to protect portions situated underneath against mechanical impairment and the shape of which produces a flush connection to the outer side 7 of the housing 1. The cover 19 is made of a dielectric material, that is to say one which is not or only weakly electrically conductive, in the present case plastic. The rest of the housing 1 can also be protected against mechanical damage by a cover. Furthermore, the cover 19 may also be fitted on an underside of the housing 1.

Inside the housing 1 there are additionally further components of a tachograph, particularly a processor or a programmable microcontroller, a memory unit and a data bus. The data bus receives data from sensors which are fitted at different points in the vehicle, e.g. a clock generator fitted on a shaft. These data are processed by the processor and are stored in a memory unit. The stored data can be output on the display element 28 or can be transmitted to an external memory. The module for processing the geoposition data is connected directly to a bus of the processor, as a result of which data processed by the module are supplied to direct further processing.

Figure 2:
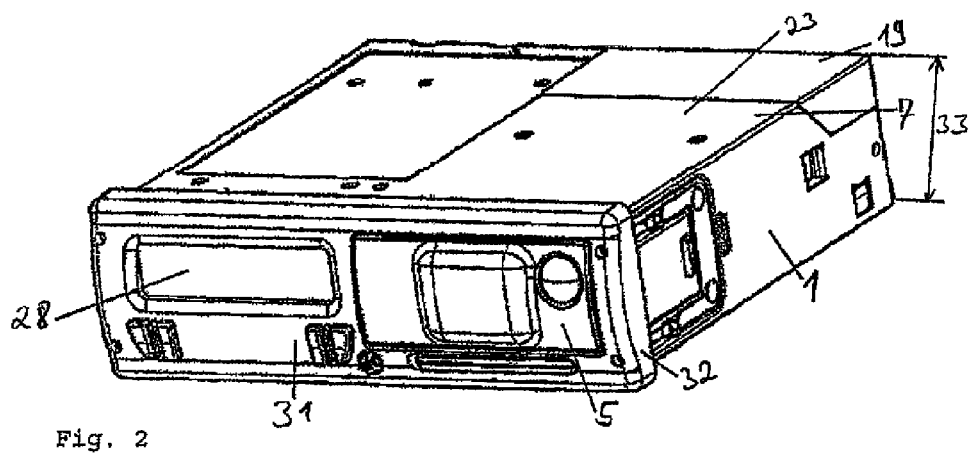
FIG. 2 is the housing of an onboard information system, where the antenna is provided with a cover.

In the figures below, identical elements have each been provided with the same reference symbols. FIG. 2 shows a view, corresponding to FIG. 1 of an onboard information system, but the antenna 2 is now protected against mechanical impairment by an antenna cover 5. The antenna cover 5 is likewise made of a dielectric material, that is to say one which is not or only weakly electrically conductive, in the present case plastic, and finishes flush with the rest of the housing 1 or may also be part of the panel 32. In the exemplary embodiment shown, the antenna cover 5 simulates the shape of the antenna 2, i.e. the antenna cover 5 protrudes into the vehicle interior at the position of the reception body 3. Alternatively, the antenna cover 5 may also have a planar front without elevations or depressions. The antenna cover 5 covers the complete surface area of the antenna 2, but has a cutout for an operator control element. In the exemplary embodiment shown, the antenna cover 5 is bonded to the antenna 2, but may also be mounted thereon by latch connections, a clamp joint, or a screw joint. The surface areas of the cover 5 and the antenna 2 are in contact with one another, but it is also possible to use a cover that has an interspace relative to the antenna 2 or individual portions thereof, that is to say which is connected only to the reception body 3.

Figure 3:
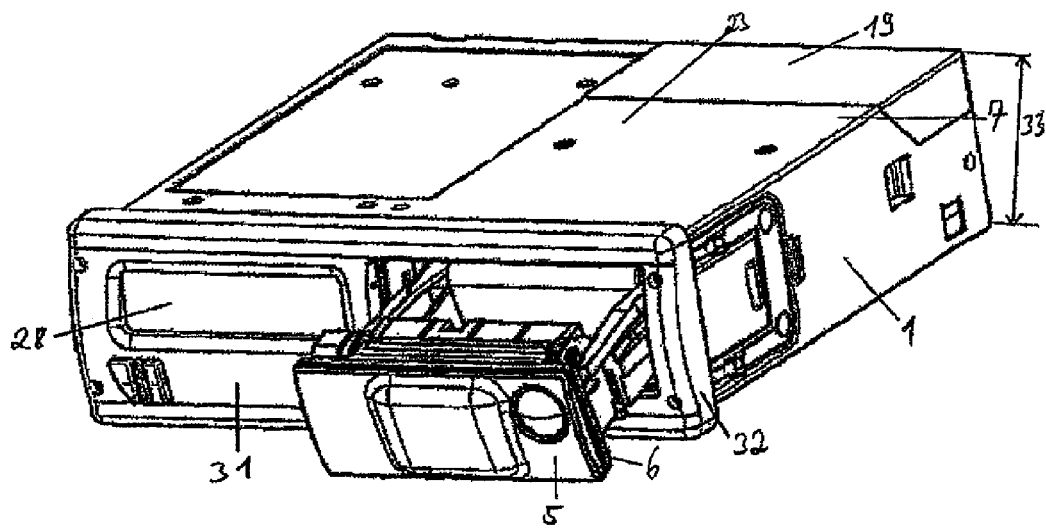
FIG. 3 is the housing of an onboard information system in which the antenna provided with a cover is fitted on a pulled-out drawer.

FIG. 3 shows an onboard information system corresponding to FIG. 2, but the antenna 2 which is also covered by the antenna cover 5, is mounted on a drawer 6, which can be pulled out of the housing 1. The drawer 6 may be a printer drawer into which a roll of paper for printing the captured vehicle-related data is inserted and which can be pulled out in order to change the roll of paper, for example. Fitting the antenna 2 on the outer side, which faces the vehicle interior of the drawer 6 affords the advantage that the antenna 2 protrudes further into the vehicle interior when the drawer 6 is in the pulled-out state, is therefore more able to receive signals and at the same time is at a greater distance from electrically conductive portions of the housing 1, which likewise favors reception. This is advantageous because in a vehicle interior it is generally possible to receive only indirect satellite signals, that is to say signals that enter the vehicle interior only through an element which attenuates the signal power, such as a screen, the signal strength of said signals again being lower than in the case of direct signals. Furthermore, the signals in the vehicle interior are ordinarily reflected before they are received, and they again lose signal strength in the process.

Figure 4:
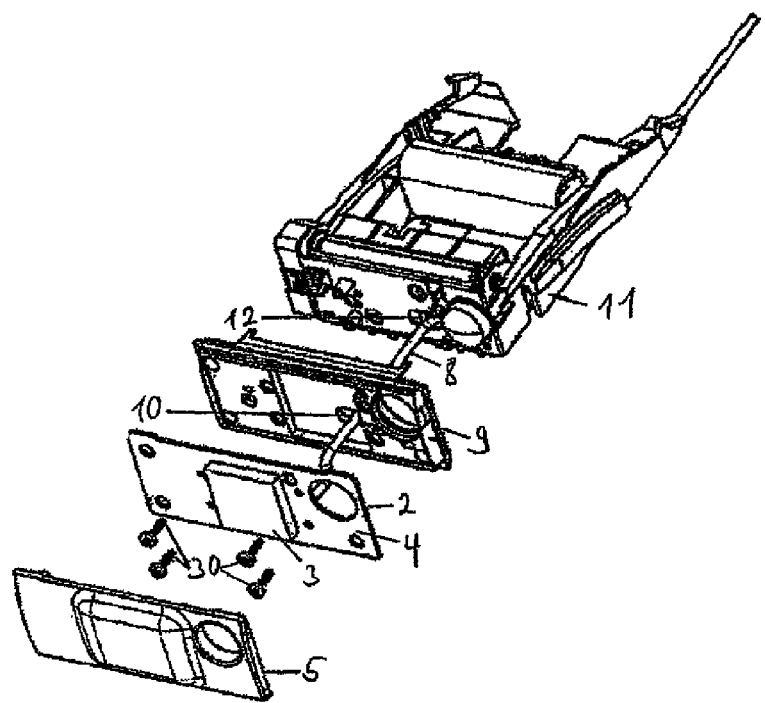
FIG. 4 is an exploded view from the front of the drawer with the antenna and the cover.

FIG. 4 is an exploded front view of the precise design of the drawer 6 shown in FIG. 3. The drawer 6 comprises a drawer core 11 on which all other elements are mounted and which can be retracted in the housing 1. In the case of a printer drawer, the roll of paper is placed in the drawer core 11. The drawer core 11 may comprise an electrically conductive or dielectric material. That side of the drawer core 11 which faces the vehicle interior has a receiving plate 9 mounted on it, this being able to be done by means of screwing, clamping or adhesive bonding. The receiving plate 9 comprises a dielectric material and has a cutout for receiving an amplifier for the antenna 2 with a precise fit, said amplifier being fitted on the rear of the ground plane 4. The receiving plate 9 has the antenna 2 mounted on it, which can again be done by screwing, clamping, or adhesive bonding. In the exemplary embodiment shown, the antenna 2 is mounted by at least one screw 30 directly on the drawer core 11 by virtue of the ground plane 4 and the receiving plate 9 containing cutouts for the screws. The antenna 2 is covered by the cover 5. The antenna 2 is connected by an antenna cable 8, in the present case a coaxial cable, to the module for processing satellite-based geoposition data which is situated inside the housing 1. The antenna 2, the receiving plate 9 and the front of the drawer core 11 have essentially the same surface area, which means that the antenna 2 covers the surface area of the drawer 6 pointing toward the vehicle interior.

The antenna cable 8 is connected to the antenna 2 on that side of the antenna 2 remote from the vehicle interior, and is guided through a receiving plate bushing 10 in the receiving plate 9 and a drawer core bushing 12 in the drawer core 11 into the inside of the housing 1. The length of the antenna cable 8 is proportioned such that the drawer 6 can be opened without tensioning the antenna cable 8. The receiving plate bushing 10 and the drawer core bushing 12 are in the form of elongate holes and have a width slightly greater than the diameter of the antenna cable 8 which is guided through, the design as an elongate hole allowing the antenna cable 8 to be fitted more easily. The receiving plate bushing 10 and the drawer core bushing 12 are situated on the receiving plate 9 and the drawer core 11 at identical positions, but there may also be different positions provided therefor on both components.

Figure 5:
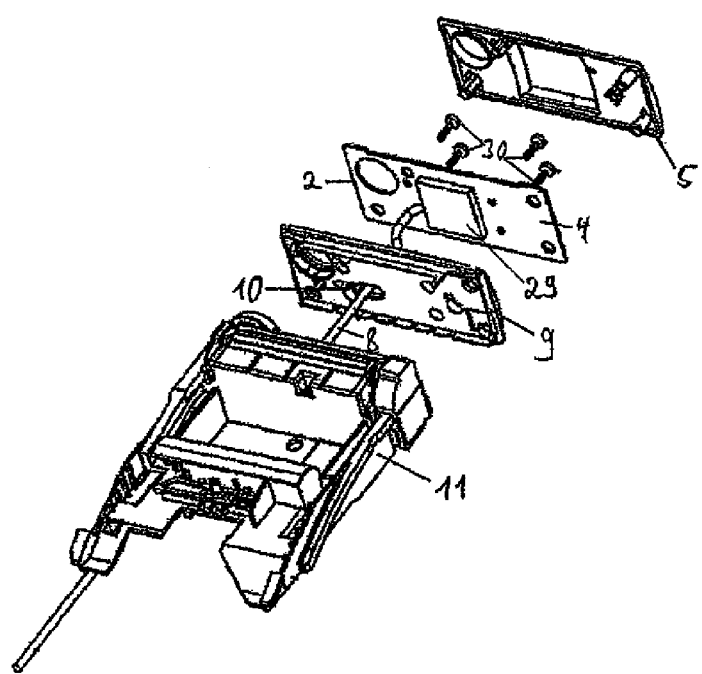
FIG. 5 is an exploded drawing from the rear of the drawer with the antenna and the cover.

FIG. 5 shows the drawer 6 as shown in FIG. 4 in a rear view. The rear of the antenna 2 has an amplifier 29 arranged on it which amplifies the signals received by the reception body 3 and forwards them via the antenna cable 8 which is attached to the amplifier 29. The amplifier 29 is located on the rear of the antenna 2 at the position at which the reception body 3 is located on the front of the antenna 2, but the amplifier 29 may also be located at a different position.

Figure 6:
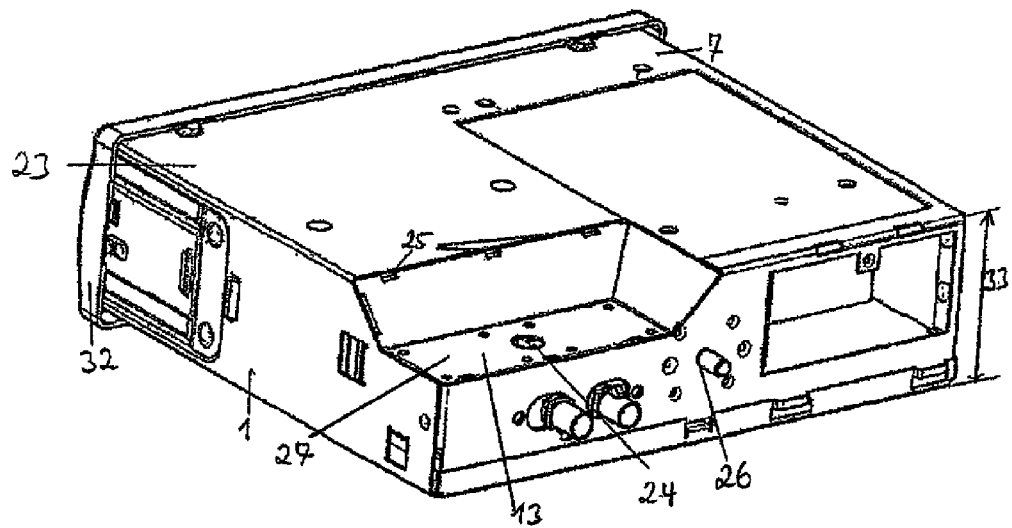
FIG. 6 is a perspective rear view of a housing of an onboard information system with a recess.

FIG. 6 is a perspective rear view of a housing 1 of an onboard information system according to the invention, i.e. the side of the housing 1 which is shown is remote from a vehicle interior or covered by an installation pit following installation. The housing 1 has a recess 13 on a top 23 of an outer side 7. This recess 13 has been covered by the cover 19 in FIG. 1. The recess 13 is used for holding a mobile radio antenna which is fitted on a side of the housing 1 which is opposite the antenna 2 so that both antennas do not interfere with one another. Since the antenna 2 for receiving satellite-based geoposition data is intended to receive substantially weaker signals, it needs to be fitted at an exposed location on the housing and needs to be at the greatest possible distance from a mobile radio antenna. The mobile radio antenna receives and sends signals with a substantially greater signal strength and is therefore able to interfere with or totally prevent reception by the antenna 2.

In the region of the recess 13, the housing 1 has a cohesive surface which is integrally connected to the housing 1. The recess 13 has a contact face 27 arranged parallel to a top 23 of the housing 1, for a base of a mobile radio antenna which is connected to the top 23 of the housing 1 by beveled edges. The recess 13 has beveled edges so as firstly to ensure a sufficient distance between a mobile radio antenna and the housing 1. Secondly, the beveled edges also provide space for installing further modules or components inside the housing 1. In the exemplary embodiment shown, the edges run at an angle of 45°, but other angles, preferably in the range between 30° and 60°, are also possible. In the case shown, the recess 13 is situated at the edge of the housing 1, but the recess 13 may also be situated centrally in the housing 1. The recess 13 may also be parallelepipedal, that is to say may have no beveled edges, or alternatively may also have a beveled edge on at least one side and a right-angled edge on at least one other side. A single notch out of the housing 1 in the form of a hole is also covered by the invention as a recess 13, in which case a mobile radio antenna is positioned in the resultant depression.

The onboard information system furthermore comprises a mobile radio module located inside the housing 1 and is concealed thereby. Like the module for processing satellite-based geoposition data, the mobile radio module is connected directly to a bus of the processor or of a programmable microcontroller, so that data processed by the mobile radio module are supplied to direct further processing in the processor. The recess 13 is removed from a top 23 of the housing 1 but may likewise be situated on an underside. The surface of the recess 13 is in the form of a closed surface area, with the contact face 27 of a mobile radio antenna having the same measurements as a base of a mobile radio antenna; the measurements may also be larger than an antenna base. A mobile radio antenna is fitted on that side which is remote from the vehicle interior following installation, in order to allow the greatest possible distance from the antenna 2 fitted on the front 31 and to allow the installation of display and control elements on the front 31; however, the recess 13 for a mobile radio antenna can also be made at any position on the housing 1, that is to say including on a side which faces the vehicle interior.

The recess 13 contains a housing bushing 24 through which a mobile radio antenna positioned in the recess 13 can be connected to components integrated inside of the housing 1. Furthermore, the recess 13 has at least one receptacle 25 for the connection of the cover 19 on the recess 13. In the embodiment shown in FIG. 6, a plurality of receptacles 25 are included for better mounting. In the case shown, the receptacles 25 are designed to hold latching pins on a cover 19, but there may also be a screw joint provided for the purpose of mounting the cover 19 on the housing 1. The receptacles 25 are at a distance of no more than 50 mm in order to avoid long edges, since these edges act as antennas and can therefore interfere with the reception by the mobile radio antenna 17.

As a mounting element for a permanent installation in the vehicle interior, the housing 1 has at least one threaded bolt 26 used for mounting the housing 1 on a mounting apparatus in the vehicle interior, for example by screwing the threaded bolt to a nut, or for making electrical contact with other components positioned in the vehicle interior. In the exemplary embodiment shown, the threaded bolt 26 is fitted to a region of the housing 1 behind the panel 32.

Figure 7:
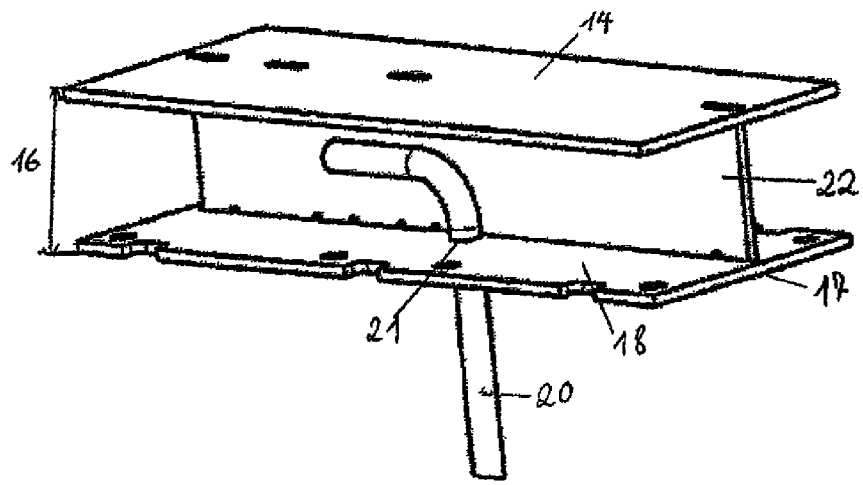
FIG. 7 is a mobile radio antenna for integration in an onboard information system.

FIG. 7 shows an exemplary embodiment of a mobile radio antenna 17. In the case shown in FIG. 7, the mobile radio antenna 17 is in the form of a PIFA antenna, that is to say in the form of a "Planar Inverted F-Shaped Antenna". In this case, a radiating plane 14 is electrically connected to a base 18 by a connecting element 22 which serves as a short-circuit line. The radiating plane 14 and the base 18 are arranged parallel to one another, and an overall height 16 is obtained as the distance between a top of the radiating plane 14 and an underside of the base 18. The mobile radio antenna 17 is made from an electrically conductive material, particularly a metal. The mobile radio antenna which can be inserted into the recess 13 can also be produced in a different design, however, for example as a patch antenna.

As a supply line or for connection to the mobile radio module or other modules which may be positioned in the housing 1, the mobile radio antenna 17 comprises a cable 20, in the present case a coaxial cable, which is guided through a cutout 21 which the base 18 of the mobile radio antenna 17 contains. The cable 20 may be soldered, screwed or clamped to the mobile radio antenna 17, particularly to the connecting element 22 or the radiating plane 14.

The surface of the recess 13 contains a housing bushing 24 corresponding to the cutout 21 for the cable 20. The cutout 21 may be a hole in the base 18, but it may also be a cutout at one edge of the base 18. The diameter of the cutout 21 is only insignificantly larger than the diameter of the cable 20 and of smaller or the same diameter as the housing bushing 24. If the diameter of the bushing 14 is larger than the diameter of the cutouts 11, it is possible to insert an antenna connector through to one end of the cable 20, for example. This design increases the performance of the mobile radio antenna 17, while the cable 20 fills the only insignificantly larger cutout 21 almost completely and there is therefore no negative influence on the performance, since a portion of the surface area of the cutout 14 which is not filled by the cable 10 is covered by the base 8.

The mobile radio antenna 17 is suitable for receiving different mobile radio signals, for example signals based on the GSM standard, the GPRS standard, the UMTS standard, the CDMA standard, the LTE standard or another standard. The dimensions of the mobile radio antenna 17 are less than or equal to the dimensions of the recess 13. This ensures that the mobile radio antenna 17 does not protrude from the housing 1, and installation in the vehicle interior is therefore easier to perform.

Figure 8:
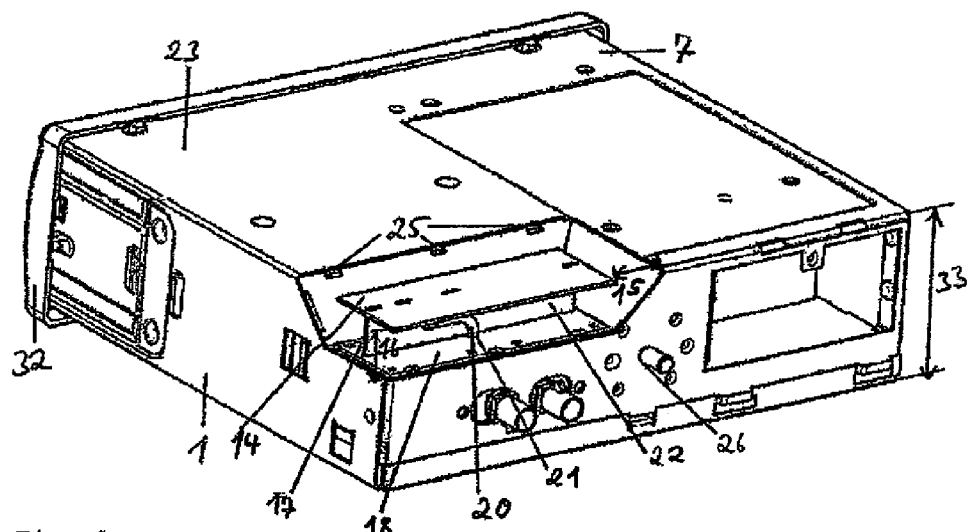
FIG. 8 is the housing of the onboard information system with the integrated mobile radio antenna.

In FIG. 8, the mobile radio antenna 17 shown in FIG. 7 has been fitted on an outer side 7 of the housing 1, shown in FIG. 6, of the onboard information system in the recess 13. In this case, the surface area of the base 18 of the mobile radio antenna 17 is connected to the outer side 7 of the housing 1, which means that a ground connection is ensured between the base 18, serving as a ground plane for the mobile radio antenna 17, and a ground plane of the housing 1, the latter ground plane being provided by the electrically conductive outer side 7 of the housing 1. The cable 20 is guided through the cutout 21 and the housing bushing 24 into the interior of the housing 1. The mobile radio antenna 17 can be connected by means of riveting, soldering, screwing or adhesive bonding. The dimensions of the mobile radio antenna 17 are less than or equal to the dimensions of the recess 13. This means that the housing 1 can be installed in a pit having dimensions according to ISO 7736 or DIN 75490 even with an integrated mobile radio antenna 17.

The top of the radiating plane 14 is at the same height as the top 23 of the housing 1 or slightly below the top 23. The radiating plane 14 of the mobile radio antenna 17 is fitted at a distance 15 from the surface of the recess 13. In the case shown, the distance 15 is approximately 100% of the overall height 16 of the mobile radio antenna 17, which means that radiation is not hampered, and is of the same magnitude both on the longitudinal side and on the transverse side of the radiating plane 14. However, the distance 15 should be at least 50% of an overall height 16 of the mobile radio antenna 17 so as not to impair the performance characteristics of the mobile radio antenna 17 too greatly. However, the distance 15 also does not need to be of the same magnitude on all sides provided that the cited minimum distance is not transgressed in each case. Therefore, a relatively high level of variability is achieved for the integration of further modules in the interior of the housing 1.

The surface area of the base 18 covers the housing bushing 24 in the housing 1, which means that the performance of the mobile radio antenna 17 is not impaired by the housing bushing 24 having a greater diameter than the diameter of the cutout 21.

Even with other shapes for the recess 13, for example a notch out of the housing 1, it is fundamental that the radiating plane 14 of the mobile radio antenna 17 firstly does not protrude over the dimensions of the housing 1, in order to ensure simple installation, but secondly is at a sufficient distance 15 from an electrically conductive portion of the housing 1 and is also positioned as close as possible to the outer side 7 of the housing 1. This achieves transmission and reception characteristics of appropriate quality for the mobile radio antenna 17 in a compact design. These prerequisites should be realized regardless of the design of the mobile radio antenna 17, that is to say that when a patch antenna is used, for example, the radiating plane 14 thereof must likewise be at a distance 15 from electrically conductive portions of the housing 1 and allow a flush finish with the housing 1.

Figure 9:
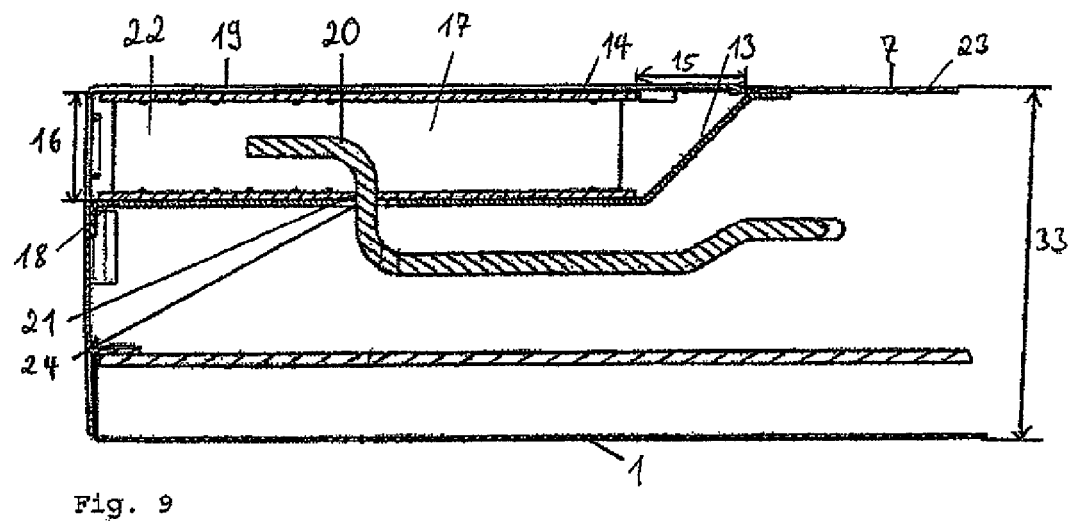
FIG. 9 is a section through the housing parallel to a rear of the onboard information system with the integrated mobile radio antenna.

FIG. 9 is a section through the housing 1 parallel to the rear of the housing 1. The cable 20 is connected to the mobile radio antenna 17 and is guided through a cutout 21 in the base 18 of the mobile radio antenna 17 and the housing bushing 24 into the interior of the housing 1. The recess 13 has beveled edges in order to ensure a distance 15 which, as already explained, is approximately 100% of the overall height 16 of the mobile radio antenna 17 between the radiating plane 14 and the housing 1. The base 18 of the mobile radio antenna 17 is mounted flush on a surface of the recess 13. The dimensions of the base 18 and of the contact face of the base 18 on the recess 13 are of essentially the same magnitude. This allows good contact to be produced with little space requirement.

In addition, the mobile radio antenna 17 is protected against mechanical damage by a cover 19. The cover 19 has latching pins which are introduced into the receptacles 25 and latch therein. This allows a reliable connection to be made, with the cover 19 also being able to be easily released. Alternatively, provision may also be made for the cover 19 to be mounted by screws, a magnetic connection, adhesive bonding, riveting or other connection mechanisms.

In the exemplary embodiment shown, the cover 19 is in contact with the radiating plane 14 of the mobile radio antenna 17, but it is also conceivable for an interspace to be permitted between the two portions. The cover 19 continues the top 23 of the housing 1 flush, so that a planar surface is obtained, but the cover 19 may also be situated below the top 23 of the housing 1, so that a step or bevel is produced between the cover 19 and the top 23. This results in an essentially parallelepipedal housing 1 with the cover 19, which housing is easy to install and remove.

Figure 10:
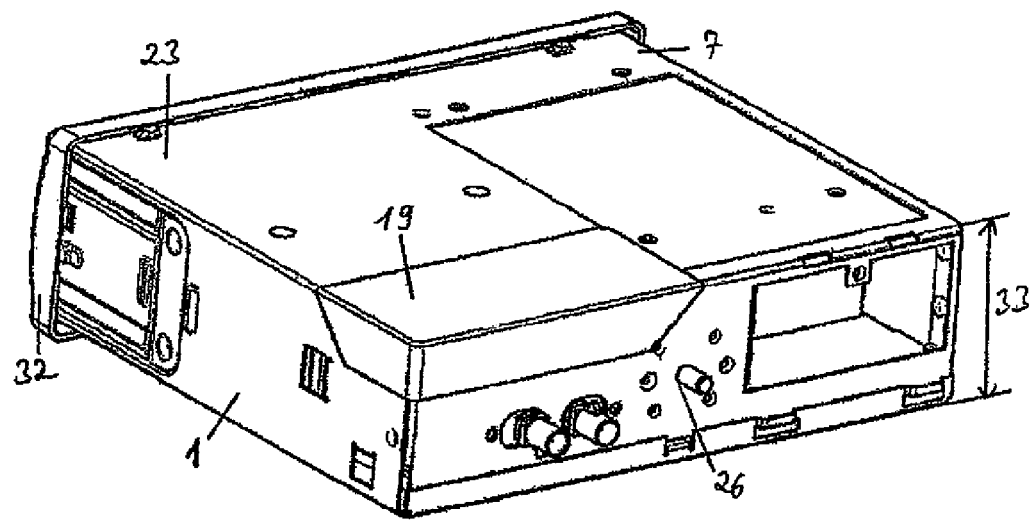
FIG. 10 is the the housing of the onboard information system with the integrated mobile radio antenna and also the cover for the mobile radio antenna.

FIG. 10 shows the housing 1 of the onboard information system from the same perspective as FIG. 6. FIG. 10 corresponds to FIG. 1, there now being a rear view available. The mobile radio antenna 17 is now concealed beneath the cover 19. The cover 19 provides a flush connection to the shape of the housing 1, so that even with the cover 19, the dimensions are suitable for installation in a pit according to ISO 7736 or DIN 75490. In the case of installation in a pit in a dashboard in a vehicle, the distance between the mobile radio antenna 17 and further electrically conductive portions of other installed appliances which may cover the mobile radio antenna 17 (e.g. a radio) should be at least 20 mm, in order to be able to send and receive signals at sufficient strength.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An onboard information system for capturing at least one vehicle-related variable, comprising:
    a housing configured to be installed in a vehicle interior;
    a module for processing satellite-based geoposition data; and
    an antenna for directly receiving the satellite-based geoposition data arranged on the housing such that in the installed state of the antenna a reception direction of the antenna points toward the vehicle interior,
    wherein the antenna for receiving the satellite-based geoposition data provides the received satellite-based geoposition data directly to the module for processing satellite-based geoposition data.

2. The onboard information system as claimed in claim 1, wherein the housing comprises a panel that covers only one side of the housing, wherein the housing has, in a region behind the panel, at least one mounting element for permanent installation in the vehicle interior.

3. The onboard information system as claimed in claim 1, wherein the antenna is a patch antenna.

4. The onboard information system as claimed in claim 1, wherein a reception body of the antenna is positioned centrally on a ground plane of the antenna.

5. The onboard information system as claimed in claim 4, wherein the ground plane of the antenna comprises a printed circuit board which is laminated.

6. The onboard information system as claimed in claim 1, wherein the antenna is fitted on a portion of the housing that protrudes into the vehicle interior.

7. The onboard information system as claimed in claim 1, wherein the housing is configured to be installed in a pit having dimensions according to an ISO 7736 standard.

8. The onboard information system as claimed in claim 1, wherein an electrically conductive portion of the housing is fitted on a side of the antenna that is remote from the reception direction of the antenna.

9. The onboard information system as claimed in claim 1, further comprising:
    a mobile radio antenna for receiving mobile radio signals; and
    a mobile radio module coupled to the mobile radio antenna.

10. The onboard information system as claimed in claim 9, wherein the mobile radio antenna and the antenna for receiving satellite-based geoposition data are arranged on opposite sides of the housing.

11. The onboard information system as claimed in claim 1, wherein the onboard information system is configured as a tachograph, a digital tachograph, and a toll collection appliance.

12. A vehicle, containing an onboard information system as claimed in claim 1, wherein the onboard information system is installed in a vehicle interior such that the reception direction of the antenna points toward the vehicle interior.

13. The onboard information system as claimed in claim 5, wherein the printed circuit board is laminated with copper.

14. The onboard information system as claimed in claim 6, wherein the antenna is fitted on a drawer.

15. The onboard information system as claimed in claim 1, further comprises one of a tachograph, a digital tachograph, and a toll collection appliance.

* * * * *